United States Patent [19]

Kucera

[11] Patent Number: 4,852,848

[45] Date of Patent: Aug. 1, 1989

[54] PIPE VIBRATION REDUCER

[76] Inventor: Richard J. Kucera, 11041 Firethorne Dr., Cupertino, Calif. 95014

[21] Appl. No.: 312,390

[22] Filed: Feb. 21, 1989

Related U.S. Application Data

[63] Continuation-in-part of Ser. No. 44,676, May 1, 1987, abandoned.

[51] Int. Cl.⁴ ............................................. F16M 13/60
[52] U.S. Cl. .................................... 248/559; 188/379; 188/380
[58] Field of Search ............... 248/559; 188/378, 379, 188/380; 267/136

[56] References Cited

U.S. PATENT DOCUMENTS

| | | | |
|---|---|---|---|
| 1,638,782 | 8/1927 | Paton | 188/380 X |
| 2,271,935 | 2/1942 | Buchanan et al. | 188/379 X |
| 2,688,047 | 8/1954 | MacIntyre | 248/559 X |
| 2,838,137 | 6/1958 | Wallerstein, Jr. | 188/380 |
| 3,314,503 | 4/1967 | Neubert | 188/379 |
| 3,658,157 | 4/1972 | Lee | 188/378 |
| 4,576,356 | 3/1986 | Kucera | 248/559 |

*Primary Examiner*—Ramon S. Britts
*Assistant Examiner*—David L. Talbott
*Attorney, Agent, or Firm*—Olson & Olson

[57] ABSTRACT

A pipe vibration reducer is provided by one or more resilient cantilever bar members each secured at its inner end to a clamp assembly mounted on a pipe and extending laterally from a vertical plane through the pipe. The outer end of the cantilever bar member mounts a pipe vibration dynamic mass. In one embodiment each of a pair of cantilever bar members mounts a dynamic mass of the same of different weight. In another embodiment a single dynamic mass extends between and is secured to a pair of cantilever bar members. In still another embodiment a pair of cantilever bar members is secured to a clamp assembly for pivotal adjustment to various positions laterally of a vertical plane through a pipe to which the clamp assembly is mounted.

7 Claims, 4 Drawing Sheets

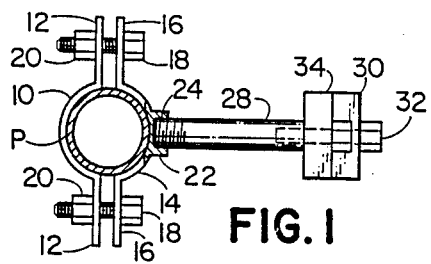
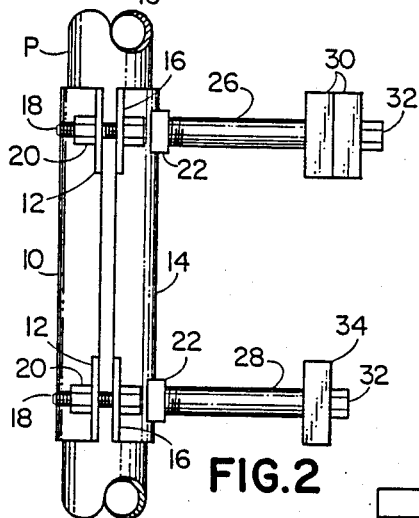
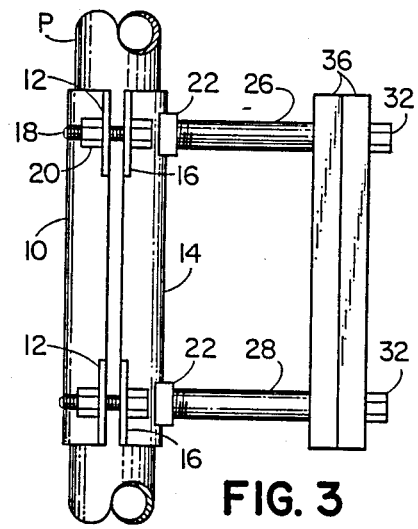
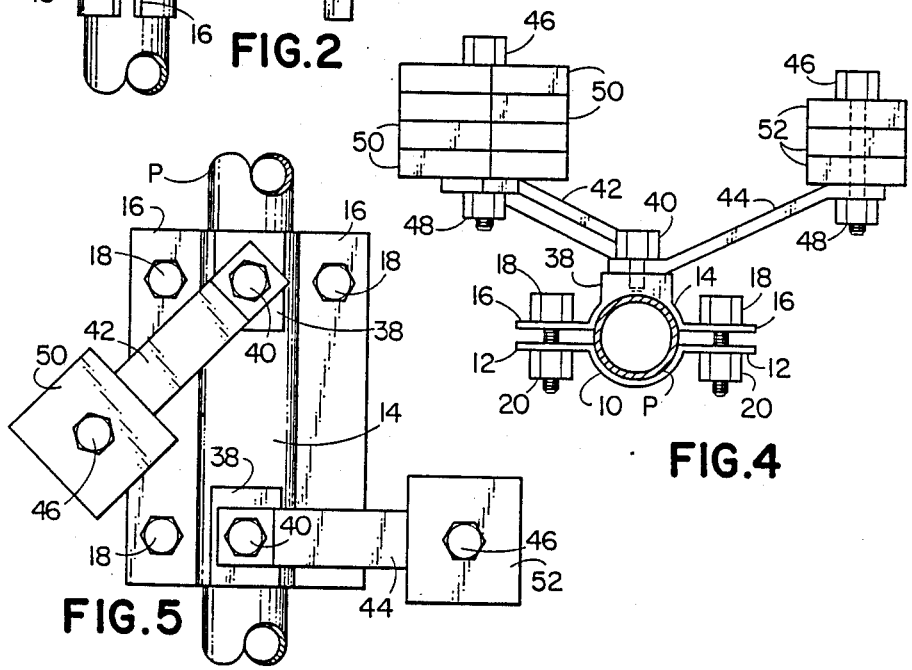

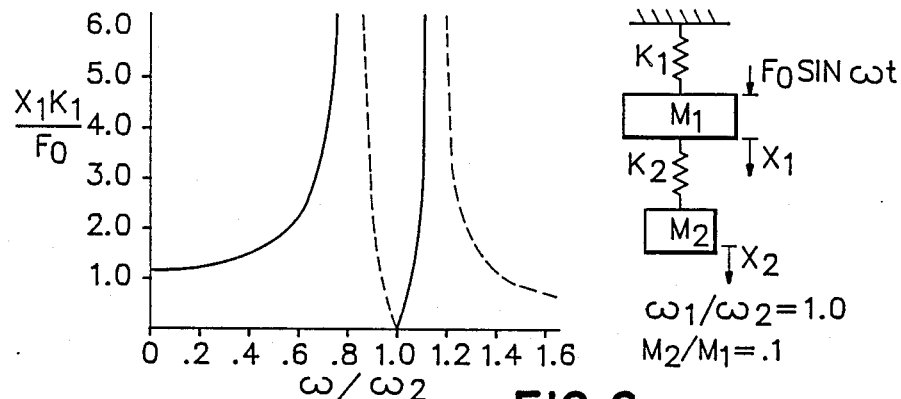
FIG. 6
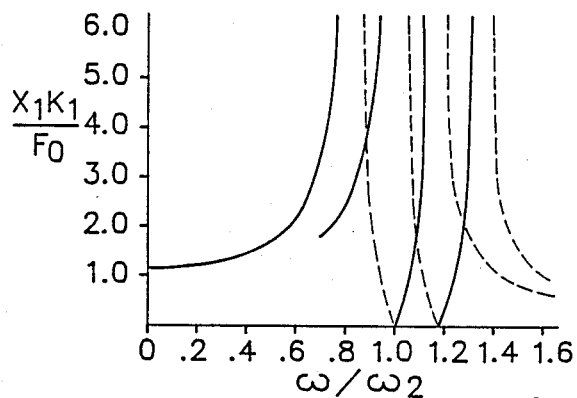
FIG. 7
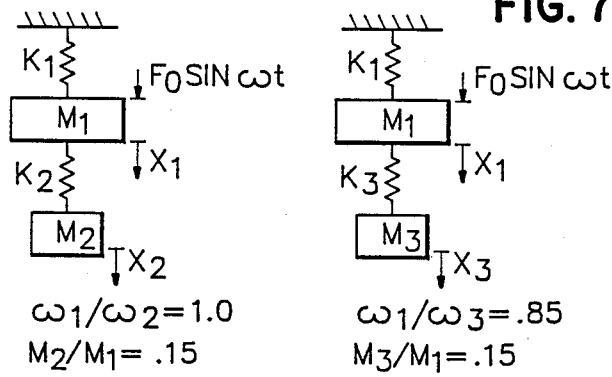

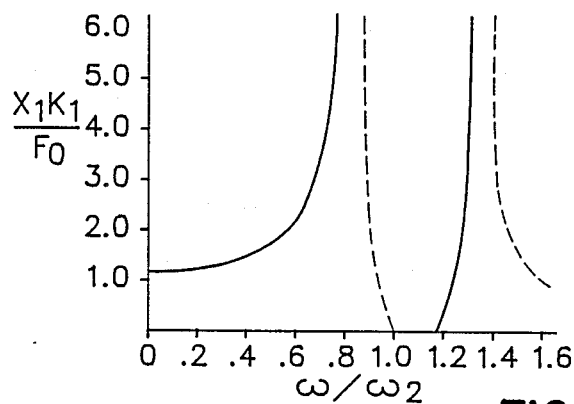
FIG. 8
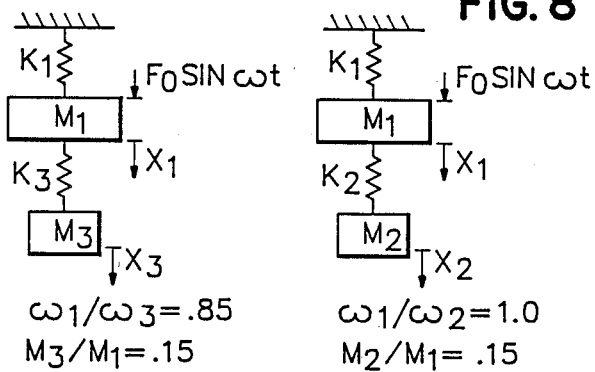
$\omega_1/\omega_3 = .85$
$M_3/M_1 = .15$
$\omega_1/\omega_2 = 1.0$
$M_2/M_1 = .15$
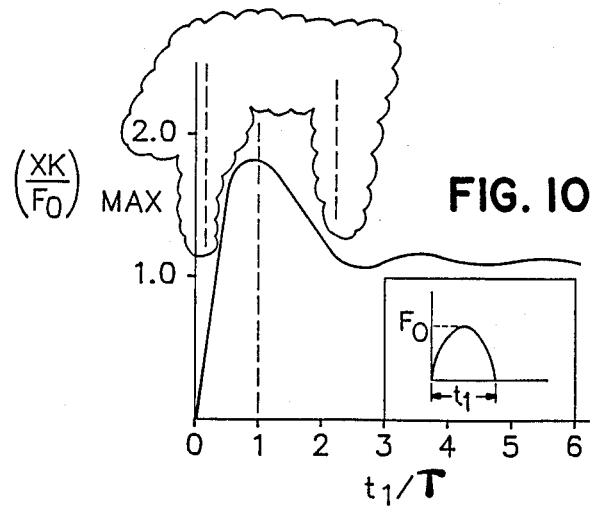
FIG. 10

PIPE VIBRATION REDUCER

This application is a continuation-in-part of application Ser. No. 044,676, filed May 1, 1987, now abandoned.

BACKGROUND OF THE INVENTION

This invention relates to devices for reducing the vibration in pipes and the like due to such dynamic loads as earthquakes, water-hammer, pump vibrations and others, and more particularly to a pipe vibration reducer of the type disclosed in my earlier U.S. Pat. No. 4,576,356.

Although the pipe vibration reducer of my earlier patent is quite effective in reducing pipe vibrations of frequencies not exceeding about 30 Hz, it has been found to be ineffective in reducing pipe vibrations of higher frequencies and has been known to cause some installation interference problems. In addition, the ball or other bearing supports for the vibration dynamic mass contribute a degree of friction that reduces the efficiency of vibration reduction. Still further, the relatively large number of parts that make up the pipe vibration reducer contributes to excessive cost of manufacture and maintenance.

SUMMARY OF THE INVENTION

In its basic concept, the pipe vibration reducer of this invention utilizes a resilient cantilever arm for attaching a vibration dynamic mass to a pipe or the like for vibration isolation.

It is by virtue of the foregoing basic concept that the principle objective of this invention is achieved; namely, to overcome the aforementioned limitations and disadvantages of my earlier pipe vibration reducer.

Another objective of this invention is to provide a pipe vibration reducer of the class described that is effective in reducing pipe vibrations of frequencies up to about 500 Hz.

Still another objective of this invention is the provision of a pipe vibration reducer of the class described in which the vibration dynamic mass is adjustable to various lateral positions relative to the pipe to minimize or eliminate installation interference problems.

A further objective of this invention is the provision of a pipe vibration reducer of the class described in which a plurality of vibration dynamic masses of the same or different weights may be mounted in natural frequency spaced apart relationship to achieve an overlapping of design frequency points with pipe unit system resonance frequency points to establish a design frequency range.

A still further objective of this invention is to provide a pipe vibration reducer of the class described which is of simplified construction for economical manufacture and is capable of being installed and adjusted with speed and facility.

The foregoing and other objects and advantages of this invention will appear from the following detailed description, taken in connection with the accompanying drawings of preferred embodiments.

BRIEF DESCRIPTION OF THE DRAWINGS

FIG. 1 is an end view of a pipe vibration reducer embodying the features of this invention, a portion being broken away to disclose details of internal construction.

FIG. 2 is a plan view as viewed from the top in FIG. 1.

FIG. 3 is a plan view of the pipe vibration reducer of FIG. 2 modified by use of a vibration dynamic mass bridging the pair of resilient cantilever arms.

FIG. 4 is an end view of a second embodiment of a pipe vibration reducer embodying the features of this invention.

FIG. 5 is a plan view as viewed from the top in FIG. 4.

FIG. 6 is a graph showing the response of a two degree of freedom system with a single cantilever arm and mass system acting as a vibration absorber.

FIG. 7 is a graph showing the response of a two cantilever arm and mass system with resonance frequencies overlapped with design points.

FIG. 8 is a graph showing the design range of frequencies produced by the combination of FIG. 7.

FIG. 10 is a graph of a typical shock spectrum for a piping design.

DESCRIPTION OF THE PREFERRED EMBODIMENTS

Figure 9:
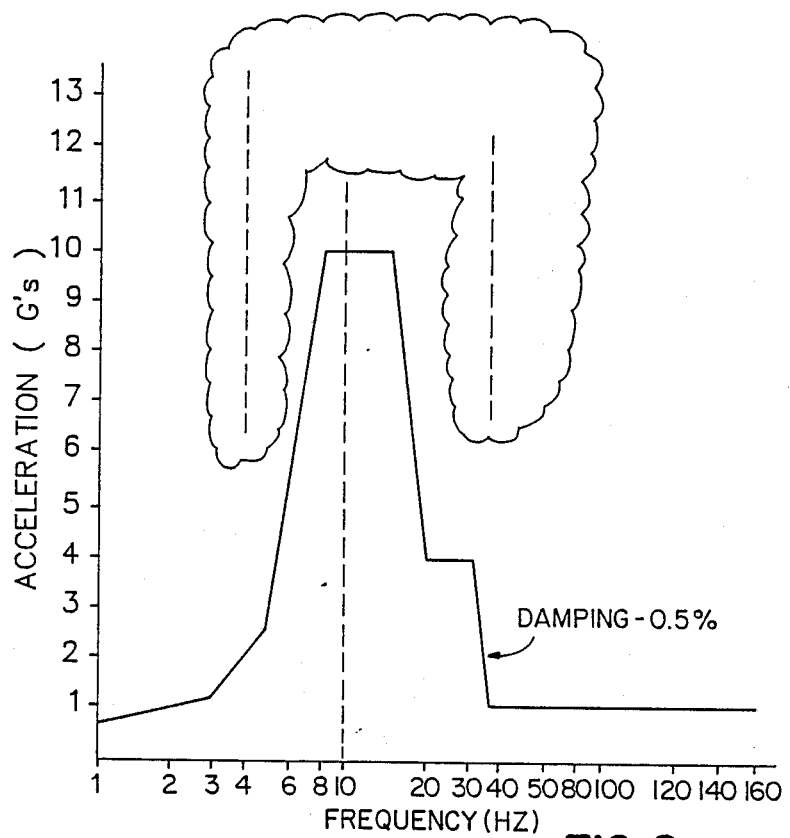
FIG. 9 is a graph of a typical seismic spectrum for a piping design.

Referring first to FIGS. 1 and 2 of the drawings, there is shown for the purpose of illustration a length of pipe P the vibration of which is to be isolated. The illustrated vibration reducer includes a back clamp section 10 provided with laterally extending side flanges 12, and a front clamp section 14 provided with laterally extending side flanges 16. The side flanges of both sections are provided with registering openings for the reception of clamp bolts 18 by which to retractably draw the clamp sections together into rigid clamping engagement with the pipe, by tightening of the nuts 20.

The front clamp section is provided with a pair of longitudinally spaced bases 22 each of which is provided with tapped bore 24 for the attachment of the threaded inner end of one of the pair of resilient cantilever rods 26 and 28. The cantilever rods extend laterally outward of the front clamp section and hence laterally outward from a vertical plane through the pipe P.

In the embodiment illustrated, a pair of vibration dynamic masses 30 which are of solid, dense and rigid material such as steel, are secured rigidly to the outer end of the cantilever rod 26, as by means of a securing screw 32 extended through holes in the masses and threaded into a tapped bore in the outer end of the rod 26. A single vibration dynamic mass 34 of similar material as mass 30 is secured rigidly on the outer end of the cantilever rod 28, also by a screw 32.

The embodiment illustrated in FIG. 3 utilizes the same clamp and cantilever rod assembly previously described, but the outer ends of the cantilever rods 26 and 28 support a pair of elongated vibration dynamic masses 36 of similar material as mass 30 which bridge the resilient cantilever rods and are secured rigidly thereto by screws 32.

In the embodiment illustrated in FIGS. 4 and 5, the clamp sections previously described are secured about a pipe P in the manner previously described with the exception that they are disposed in top and bottom positions rather than front and back positions. The top clamp section 14 is provided with a pair of longitudinally spaced bases 38 each provided with a tapped opening for the removable reception of an attaching screw 40 by which to pivotally secure the offset inner ends of the resilient cantilever bars 42 and 44 rigidly to the bases. The outer ends of the cantilever bars also are offset angularly, to be parallel to the inner attaching ends, and serve to support one or more vibration dynamic masses. The masses which are of solid, dense and rigid material such as steel are secured rigidly to the bars by means of bolts 46 the inner threaded ends of which extend through openings in the bars and receive nuts 48 by which the masses are clamped rigidly to the cantilever bars. In the embodiment illustrated in FIG. 4, the cantilever bar 42 mounts four dynamic masses 50, while the cantilever bar 44 mounts three dynamic masses 52.

In the embodiment illustrated in FIGS. 1 and 2, the resilient cantilever bar member is shown to be a rod that is solid throughout its length and of circular cross-section. It is to be understood that the rod may be of square, rectangular or other cross-sectional configuration provided with a circular, threaded inner end section for attachment to the tapped bore 24. Alternatively, the rod may also be a hollow tubing provided with end plugs by which to secure the inner end of the tubing to the bore 24 and the dynamic masses to the outer end. In all cases the bar member is longitudinally rigid but laterally resilient.

Additionally, although the illustrated embodiment of FIGS. 1 and 2 includes a pair of longitudinally spaced resilient cantilever rods 26 and 28, it is to be understood that a single cantilever rod structure, such as rod 26 and dynamic masses 30, is also operable for the purpose of this invention. In the case of the single cantilever rod, wherein the natural frequency of the dynamic mass and cantilever rod system is tuned to the frequency of the vibrating pipe, the pipe will essentially become motionless. The embodiment illustrated in FIG. 3 is essentially a single cantilever system, with the greater weight of the vibration dynamic mass 36 serving to reduce pipe vibrations of the lower frequencies.

FIG. 6 shows the response of a typical two degree-of-freedom system of the above discussed single resilient cantilever rod-mass system acting as a vibration absorber. K is a stiffness constant, in lbs./inch. $K_1$ is the stiffness of the pipe span in lbs,/inch and $M_1$ is its mass, in lb.-sec$^2$/inch, and $K_2$ is the stiffness of the rod in lbs./inch and the dynamic mass is $M_2$ lb.-sec$^2$/inch. $F_o$ is the dynamic force amplitude in lbs.; $\omega$ is the dynamic force frequency of the system in radians/second; $\omega_1$ and $\omega_2$ are the dynamic frequencies of the pipe span and of the rod-mass system, respectively; t is time, in seconds; $X_1$ is the displacement of the pipe, in inches; and $X_2$ is the displacement of the dynamic mass, in inches. FIG. 6 shows that when the smaller rod-mass system is tuned to the larger pipe span and forcing function, the motion of the pipe is reduced to zero. This point, where $\omega/\omega_2 = 1.0$ and where $\omega_1/\omega_2 = 1.0$, is the design point for the rod-mass system. For adequate performance of the rod-mass system the installation mass ratio $M_2/M_1$ should be maintained between 0.1 and 0.2. The broken line curves are actually negative values which are shown as positive values for convenience.

FIG. 7 illustrates the arrangement wherein two or more cantilever rods are mounted in longitudinally spaced position on a single clamp assembly, with each cantilever rod supporting its own discreet vibration dynamic mass. Accordingly, each cantilever system may be tuned to a different frequency. This arrangement allows the overlapping of design frequency points with resonance frequency points to establish a design frequency range, whereby to reduce the vibration of the pipe to zero.

In the embodiment of FIGS. 4 and 5, wherein the resilient cantilever bar members 42 and 44 are provided as flat or leaf spring bar structures, each vibration dynamic mass assembly is tuned to a desired frequency so that the combination is tuned to effect vibration of the dynamic masses as a cantilever. The individual bars or leaf springs can then be rotated about the axis of their pivot bolts 40 to any desired position laterally outward from a vertical plane through the pipe, to eliminate interference problems.

When two or more of the cantilever bar or leaf spring assemblies are mounted on a single clamp assembly they function as previously described by being tunable, using the overlapping of design frequency points with system resonance frequency points to establish a design frequency range.

Thus, referring to FIGS. 7 and 8, when two such bar-mass units are installed on a span of piping and the resonance frequencies of the units are overlapped with design points as shown in FIG. 7, the resulting response of the combination of units and pipe span produces a range of frequencies where the motion of the span of piping is zero, as shown in FIG. 8. $K_3$, $M_3$ and $\omega_3$ are the stiffness, mass and natural frequency, respectively, of the second bar-mass unit. This technique of overlapping units resonance frequencies with design points allows the bar-mass units to be used in reducing piping vibrations resulting from such frequency dependent loads as earthquakes, water hammer, pump starts and stops, and others.

The clouded areas in FIGS. 9 and 10 show how the natural frequencies of a set of bar-mass units and a piping system can be separated or shifted to areas of the seismic or shock spectrum where the response would be minimized. The central broken line in both figures identifies the natural frequency of the piping only, and the outer broken lines in both figures identify the natural frequencies of the piping and the bar-mass units. In FIG. 10, $t_1$ is the period of shock, in seconds, and $\tau$ is the natural period of the pipe span, in seconds.

It will be understood by those skilled in the art that various changes may be made in the size, shape, type, number and arrangement of parts described hereinbefore, without departing from the spirit of this invention and the scope of the appended claims.

Having now described my invention and the manner in which it may be used, I claim:

1. A vibration reducer for pipes and the like, comprising:
   (a) a cantilever support member,
   (b) attaching means engageable with the support member for securing the latter rigidly to a pipe or the like,
   (c) an elongated resilient cantilever bar member secured at its inner end rigidly to the support member and arranged to extend therefrom in a direction to project laterally from a vertical plane through a pipe or the like, the cantilever bar member being longitudinally rigid and laterally resilient, and
   (d) a vibration dynamic mass member of a solid, dense and rigid material which is secured rigidly to the outer end of the cantilever bar member against independent movement relative to said bar member.

2. The vibration reducer of claim 1 including vertical pivot means securing the cantilever bar member to the support member for pivotal adjustment of the vibration dynamic mass member secured thereto to positions laterally of a vertical plane through said vertical pivot means.

3. The vibration reducer of claim 1 including a pair of cantilever bar members secured at their inner ends to the cantilever support member in longitudinally spaced apart relation, and a vibration dynamic mass member is secured to each cantilever bar member.

4. The vibration reducer of claim 3 wherein the vibration dynamic mass member secured to one of the cantilever bar members is different in weight from the mass member secured to the other of the cantilever bar members.

5. The vibration reducer of claim 3 including vertical pivot means securing each cantilever bar member to the support member for pivotal adjustment of the vibration dynamic mass member secured thereto to positions laterally of a vertical plane through said vertical pivot means.

6. The vibration reducer of claim 5 wherein the vibration dynamic mass member secured to one of the cantilever bar members is different in weight from the mass member secured to the other of the cantilever bar members.

7. The vibration reducer of claim 1 including a pair of cantilever bar members secured at their inner ends to the cantilever support member in longitudinally spaced apart relation, and a vibration dynamic mass member is secured to and extends between the pair of cantilever bar members.

* * * * *